United States Patent [19]

Robbins et al.

[11] 3,946,689

[45] Mar. 30, 1976

[54] AIR DYNAMO PRESSURE REGULATION AND MODULATION DEVICE FOR SURFACE EFFECT SHIPS AND AIR CUSHION VEHICLES

[76] Inventors: Albert H. Robbins, 1415 Larch Road, Severn, Md. 21144; Freddie W. Wilson, 1925 Grace Church Road, Silver Spring, Md. 20910

[22] Filed: July 26, 1974

[21] Appl. No.: 492,313

[52] U.S. Cl. .............................. 114/67 A; 180/116
[51] Int. Cl.² .......................................... B63B 1/38
[58] Field of Search ........... 114/67 A; 180/116, 118

[56] References Cited
UNITED STATES PATENTS

| | | | |
|---|---|---|---|
| 3,050,146 | 8/1962 | Crim | 114/67 A |
| 3,208,543 | 9/1965 | Crowley | 180/116 X |

*Primary Examiner*—Trygve M. Blix
*Assistant Examiner*—Gregory W. O'Connor
*Attorney, Agent, or Firm*—R. S. Sciascia; Q. E. Hodges

[57] ABSTRACT

A device for reducing the roughness of ride of a Surface Effect Ship and producing power for use in the craft's auxiliaries. Cushion air is vented through a duct which has a generator in it; the power-absorbing capability of the generator is variable. Varying the amount of power absorbed by the generator varies the amount of air that is vented through the duct, thereby controlling the pressure in the air cushion.

5 Claims, 2 Drawing Figures

AIR DYNAMO PRESSURE REGULATION AND MODULATION DEVICE FOR SURFACE EFFECT SHIPS AND AIR CUSHION VEHICLES

The invention described herein may be manufactured and used by or for the Government of the United States of America for governmental purposes without the payment of any royalties thereon or therefor.

BACKGROUND OF THE INVENTION

Surface Effect Ships are supported primarily by the lifting force exerted by a slightly pressurized cushion of air contained between the water's surface and the craft.

Under equilibrium conditions, the lift system supplies air at a rate and pressure sufficient to offset the normal leakage under the seals and sidewalls, maintaining an essentially constant pressure. The cushion height is a design variable, dependent primarily on desired sea state operating capabilities.

Any change in cushion volume (because of relative motion between the craft and the water'surface), rate of air supply, or rate of air leakage, will cause a change in the cushion pressure and hence a change in the net lifting force.

When the craft is under way all of the above vary, resulting in high amplitude, random, primarily low frequency, vertical accelerations of the craft.

The craft will follow a path with respect to the surface of the water that can take one of two modes: contouring or platforming. In the contouring mode the craft stays a constant height above the local surface and follows all of its contours. In the platforming mode the craft does not follow the contours of the surface but rather maintains a nearly constant horizontal path regardless of the water's surface. (i.e. negligible pitching motion.)

The mode which the craft will assume is primarily a function of its speed. Below what is termed "hump speed" the craft will usually be in the contouring mode, above what is termed will usually be in the platforming mode. "Hump speed" is that speed at which the effective drag on the craft goes from a high value to a lower value; the phenomenon is somewhat alike that which occurs when a hydrofoil craft enters the full planing mode of operation.

In the contouring mode, cushion pressure (which is a function of the vehicle's weight and support area) remains essentially constant. At high forward speeds over rough water, the rate of rise and fall of the vehicle as it follows the water's surface can approach several cycles per second. This results in an uncomfortable ride due to the pitching motion induced by the craft following the water's surface; furthermore, it subjects the craft to potentially damaging stresses.

In the platforming mode, the distance between the craft's deck and the water's surface is constantly varying. This results in a constantly varying cushion pressure, which could approach resonance under certain conditions. Further, since the vehicle's vertical motions are of relatively low amplitude, the craft can slam into the tops of the higher waves. This produces an extremely uncomfortable ride as well as subjecting the craft to potentially damaging forces.

The above problems are alleviated by modulating cushion pressure, as is well known in the art.

In the prior art, the air that was vented from the cushion to reduce its pressure was dumped overboard, wasting the energy contained within it; the present invention is a method and means for extracting useful work out of the cushion air that is vented, thereby supplying auxiliary power while reducing fuel consumption.

SUMMARY

Briefly, the present invention is an air-driven turbine or other similar device placed in the duct leading from the air cushion to the atmosphere. The turbine drives an electric generator or hydraulic pump, and the electric power or hydraulic fluid is used to drive the craft's auxiliaries. The turbine and/or the device it drives is variable; when less air is to be vented, the turbine and/or the device it drives is adjusted to extract more energy from the vented air, which increases the effective flow resistance of the duct and decreases the rate of airflow through the duct. When more air is to be vented, the turbine and/or the device it drives is adjusted to extract less energy from the vented air, which results in an increase in the rate of airflow through the duct. The auxiliary power derived from the vented air is considerable, since in a large (>100 tons) Surface Effect Ship the working pressure and amount of air that is constantly vented is likewise considerable.

OBJECTS OF THE INVENTION

Accordingly, it is an object of the present invention to provide an improved Surface Effect Ship.

It is a further object to provide auxiliary power for a Surface Effect Ship while reducing overall fuel consumption of the craft.

It is a further object to reduce the stresses and forces on the fans and fan drive systems by minimizing the rapid and extreme back pressure variations exerted on them by unregulated motion induced cushion pressure variations.

It is a further object to obtain auxiliary power for a Surface Effect Ship from energy that is normally wasted.

It is a further object to obtain auxiliary power for a Surface Effect Ship and to simultaneously control air cushion pressure in the craft.

Other objects and advantages of the present invention will be obvious from the following specification and accompanying drawings.

DESCRIPTION OF THE PREFERRED EMBODIMENT

Figure 1:
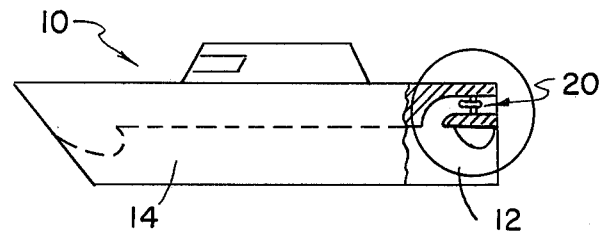
FIG. 1 ahows a Surface Effect Ship which incorporates the present invention.
Figure 2:
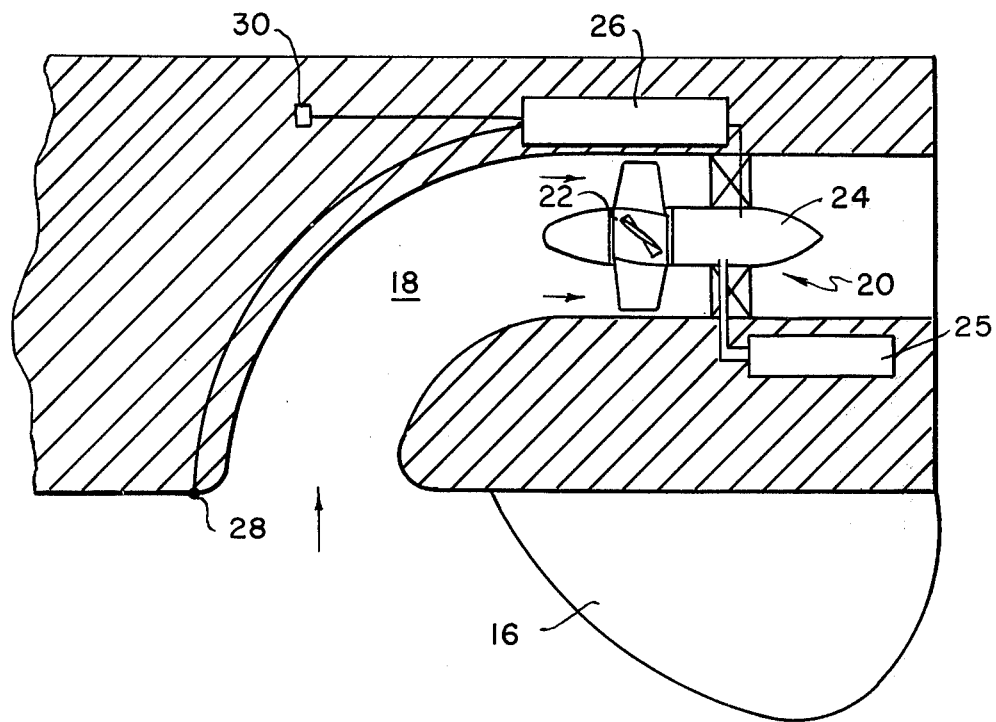
FIG. 2 is an enlarged view of the circled portion of FIG. 1.

As shown in FIGS. 1 and 2, the present invention is a part of a Surface Effect Ship 10. During operation of the craft, a fan (not shown) produces a cushion of air in plenum chamber 12 which is formed by sidewalls 14 and seals 16. Although the following description refers to a craft having rigid sidewalls, the invention obviously can be applied to a craft having a flexible skirt; it can also be applied to a craft which travels over land rather than water. In short, it applies to all vehicles which travel on a supporting cushion of air maintained underneath the vehicle. The fan continually supplies more air than is required for all modes of operation of the craft, and the excess air is continually vented through duct 18. Controlling the amount of air that is vented through duct 18 controls the rate of air-flow from the cushion, one of the three main variables determining cushion pressure.

Placed in duct 18 is energy conversion means 20, as shown in FIG. 2. Energy conversion means 20 comprises an air powered energy conversion device 22 driving a second energy conversion device 24. Air powered energy conversion device 22 is shown as an axial flow turbine; however, it may be any other form of turbine or other device which converts the energy of a flowing stream of gas to some form of mechanical energy. For simplicity, it will be referred to in succeeding portions of the specification as a turbine. Second energy conversion device 24 is driven by turbine 22, and converts its mechanical energy to another form such as electricity or high pressure hydraulic fluid; for simplicity it will be referred to in succeeding portions of the specification as a generator. The output of generator 24 powers auxiliaries 25.

Turbine 22 is a variable output turbine, as is well known in the turbine art. The blades of the turbine can be set at a variable angle with respect to the flowing gases, and will thus present a varying amount of resistance to the gases; this will in turn vary the amount of air that flows through the duct.

Generator 24, which absorbs the mechanical energy of turbine 22, is also inherently variable. That is, the output of generator 24 can be varied in the conventional manner, which will then put a variable load on the turbine, which will result in a variable amount of resistance presented by the turbine to the flow of gas due to the fact that the turbine will be slowed down by the increased load on it.

For example energy conversion means 20 can be a ram air turbine power unit such as is manufactured by AiResearch Manufacturing Co. division of the Garrett Corp. The ram air turbine power units comprise a ram air driven turbine integrated with an electrical generator and/or a hydraulic pump; the turbine blades are adjustable and have a frequency response that is in the range of 20–22 Hz. The frequency response needed for the system of the present invention will be approximately 6 Hz, hence these ram air turbine power units are capable of responding to the pressure fluctuations of the craft. A unit that is suitable for use in the present invention is AiResearch Part No. 953036.

Computer 26 determines the setting of turbine 22 and/or generator 24. It receives inputs from plenum chamber pressure sensor 28 and vehicle accelerometer 30, and then adjusts the turbine or generator in accordance with a pre-determined program.

A computer which is used to control the air cushion in a Surface Effect Ship and which is suitable for incorporation into the present invention is shown in U.S. Pat. No. 3,181,638. In this patent the variations in cushion pressure and vertical accelerations of the vehicle are fed into a "summating computer," the output of which is used to drive a servo motor which actuates the means for varying the cushion air flow. Such a computer can be used in the present invention, with the output being used to vary the angles of the blades of the ram air driven turbine.

Operation of the system is as follows. In the contouring mode of operation, the craft will follow the contours of the waves and will move up and down at a frequency that is a function of its forward speed; the resulting motion is combined pitching and heaving. In this mode, the inputs from accelerometer 30 are fed to computer 26 which then adjusts turbine 22 and/or generator 24. When the accelerometer senses that the craft is being lifted up the crest of a wave, computer 26 will decrease either the angle of the blades of turbine 22 or the output of generator 24, thereby decreasing the amount of resistance to flow in duct 18 and increasing the amount of airflow through it. The increase in airflow out of plenum chamber 12 will decrease the height of the craft above the water, thereby cancelling out some of the effects of the upward acceleration of the craft due to the wave. When the craft goes into the trough of the wave, computer 26 will increase either the turbine blade angle or the output of the generator, thereby decreasing the amount of airflow through duct 18. The decrease in airflow out of plenum chamber 12 will increase the cushion pressure and reduce the craft's downward acceleration.

When the craft is in the platforming mode, the problem is vibration of the ship due to rapid changes in plenum chamber pressure. Therefore computer 26 will respond to inputs from plenum chamber pressure sensor 28. Plenum chamber pressure will decrease when the craft is over the trough of a wave, and in response computer 26 will increase the resistance to flow in duct 18 to increase the pressure in plenum chamber 12. Conversely, when the craft is on the crest of a wave the computer will decrease the resistance in the duct to decrease plenum chamber pressure.

Experience has indicated that the highest frequency of wave excited ship motions which must be attenuated is of the order of 10 cycles per second, which occurs in the platforming mode. This is within the capabilities of variable turbines of the present state of the art; it is also within the capabilities of present day generators.

Some prior art plenum chamber pressure control schemes involved the air supply fan; however, these are high power, heavy complex and expensive machines with rather high inertia and long response times. Further, the shocks that were imposed by the variable fans on the drive train were rather severe. The present invention works in the low power range (hundreds rather than thousands of horsepower) thereby reducing stresses on the lift system. It is coupled directly to the cushion, and hence has a short response time.

From the foregoing it will be seen that the electrical (or hydraulic) power that is produced varies. However, a certain minimum amount is always produced. Therefore the system can be designed such that the minimum produced is the amount that is normally required, with the excess dissipated as heat; or it can be designed to work in conjunction with another system, with the total output of both systems being the amount that is required.

Obviously many modifications and variations of the present invention are possible in light of the above teachings. It is therefore to be understood that within the scope of the appended claims the invention may be practiced otherwise than as specifically described.

What is claimed is:

1. In a vehicle which travels on a cushion of air which is contained within a plenum chamber and which is vented to the atmosphere, the improvement comprising:

a duct leading from said plenum chamber to the atmosphere through which said air is vented;
   an air powered energy conversion device driving a second energy conversion device within said duct operated by said vented air; and means to vary the resistance to flow through said duct and said energy conversion devices.

2. A vehicle as in claim 1 wherein the means to vary the resistance to flow through said duct and said energy conversion devices includes means to vary the amount of energy absorbed by said air powered energy conversion device.

3. A vehicle as in claim 1 wherein the means to vary the resistance to flow through said duct and said energy conversion devices includes means to vary the output of said second energy conversion device.

4. A vehicle as in claim 2 wherein said air powered energy conversion device is a variable output turbine.

5. A vehicle as in claim 3 wherein said second energy conversion device comprises an electrical generator.

* * * * *